United States Patent Office.

EDWARD HUBBARD RUSSELL, OF PARK CITY, UTAH TERRITORY.

PROCESS OF EXTRACTING METALS FROM ORES AND METALLURGICAL PRODUCTS.

SPECIFICATION forming part of Letters Patent No. 295,815, dated March 25, 1884.

Application filed March 3, 1884. (No specimens.)

*To all whom it may concern:*

Be it known that I, EDWARD H. RUSSELL, of Park City, in the county of Summit, and in the Territory of Utah, have invented certain new and useful Improvements in Processes of Extracting Metals from Ores and Metallurgical Products; and I do hereby declare that the following is a full, clear, and exact description thereof.

In the ordinary process of leaching or lixiviating ores or metallurgical products with a hyposulphite solution, water is first turned onto the mass of material and allowed to filter down through it. This dissolves out and removes the base salts which are soluble in water. After these salts have been dissolved out a solution containing a hyposulphite of an alkali or alkali earth is turned on and caused to filter through the material. This dissolves out and carries down with it the chloride of silver, a portion of the gold, and some copper. The resultant solution is then conducted into precipitating tubs or tanks, where the metals contained in it are precipitated, usually as sulphides. The solution is then ready for use again. While this solution takes out the chloride of silver and a portion of the gold and copper contained in the ore or metallurgical product being treated, it attacks but slightly or not at all metallic silver, sulphide of silver and gold, and compounds of silver with antimony or arsenic. The metallic silver and these compounds which are often contained in ores or metallurgical products are then but imperfectly or not at all separated therefrom by the leaching process, in which the hyposulphite solution alone is used, but remain in the material containing them, and are thrown away with the tailings.

The object of my invention is to thoroughly remove them all from the ore or product, and so save them. This I do by subjecting the ore or product to the dissolving action of another solution, which, as I have described, has the property of dissolving out said metals and metallic compounds. This solution is preferably applied to the mass of material after the chloride has been leached out by the ordinary process, but can be used successfully and effectively directly upon the ore without the latter being first subjected to the ordinary leaching process with the simple hyposulphite solution, as it also has the property of dissolving chloride of silver. The ore or product can be subjected to the dissolving action of the solution or solutions in any of the well-known ways instead of by the leaching method. The solution with which I treat the ore or product after leaching it with the ordinary hyposulphite solution consists of an ordinary hyposulphite solution to which has been added a soluble compound or salt of copper, of which the most available, effective, and suitable one is the sulphate usually called "blue-stone." The other compounds or salts of copper which I contemplate using are the chloride, nitrate, carbonate, and acetate, cupreous carbonate, ammoniated copper, and hydrate of copper. I have named them in the order of their effectiveness, the hydrate being the least effective. The sulphate or other soluble salt of copper renders the solution capable of attacking and dissolving out metallic silver, sulphide of silver and gold, and compounds of silver with antimony and arsenic. When the sulphate of copper is added to a hyposulphite solution, the double salt of cupreous hyposulphite and sodium hyposulphite is formed in the solution. That such is the case is shown by the fact that the above-named double salt is precipitated as a canary-yellow powder if concentrated solutions are mixed, this double salt being much less soluble in water than either of the reagents alone. It is this double salt having the formula $Cu_2S_2O_3Na_2S_2O_3$, which acts with such energy and brings metallic silver, sulphide of silver and gold, and the metallic compounds referred to hereinbefore into solution. In effecting this, no metallic silver or chloride of silver is formed. The cupreous hyposulphite double salt changes to an argentic hyposulphite double salt. An equivalent of copper is replaced by an equivalent of silver, while the copper combines with those elements with which the silver was originally associated. This reaction is not only new to chemistry, but is of the greatest utility and importance in the extraction of silver from ores and metallurgical products by hyposulphite solutions. The solving energy of the solution for metallic silver and silver sulphide becomes greatest when the solution contains, for an equivalent of sulphate of copper, two equivalents of sodium hyposulphite: $4Na_2S_2O_3 + 2CuSO_4 = Cu_2S_2O_3Na_2S_2O_3 + 2Na_2SO_4 + Na_2S_4O_6$. I have found that the double salt of cupreous hyposulphite and sodium hyposulphite will also be formed in a hyposulphite solution when any one of the soluble salts or compounds of copper set forth above, besides the sulphate is added to said solution.

In practice I make my compound or second solution by adding to a solution containing from one to five per cent. of hyposulphite of an alkali or alkali earth one to three per cent. of one of such compounds or salts of copper.

Where, as indicated above as being preferable, the ore or product is first leached in the ordinary manner with the simple hyposulphite solution to dissolve out the chloride of silver, the solution, after passing through the ore, is subjected to the ordinary process of precipitation, so that the metal held in the solution is separated therefrom, and said solution is ready to be used again. The mass of ore or product is then subjected to the action of my new solution, which is turned on and allowed to filter down through it. By this the metallic silver, compounds of silver or gold with sulphur, and of silver with arsenic and antimony, are dissolved out and removed. The resultant solution is then subjected to the usual and well-known precipitating process, to precipitate the metals therefrom in the form of sulphides.

It is best, I find, to leach several lots of ore with the compound or second solution before precipitating the metals therefrom, as the percentage of silver in the solution is then, of course, greatly increased, and the bullion can then be made to contain more silver than copper, as is desirable.

My solution, as described, can be used successfully in treating roasted or unroasted ores— ores that have been subjected to chlorine gas— and various metallurgical products.

The preliminary washing or leaching of the ore or product with water can obviously be dispensed with, if desired, as it is not necessary in order to make successful the action of the simple hyposulphite solution and my new solution.

I do not claim herein the compound solution which I use and which is described hereinbefore, as that is covered and claimed in another application filed by me December 15, 1883, No. 114,670, and now pending; nor do I claim herein the process in the carrying out of which such solution is used upon the ore or product without a previous leaching of the same with the ordinary hyposulphite leaching solution, as such process is covered and claimed in another application, No. 110,026, filed by me October 25, 1883. The present application is filed in lieu of my two applications No. 67,001 and No. 101,783, filed July 17, 1882, and July 24, 1883, respectively.

Having thus described my invention, what I claim is—

1. The process of removing precious metals from ores and metallurgical products, which consists in first dissolving out therefrom with water the salts soluble therein, then subjecting the mass to the dissolving action of a hyposulphite solution, and finally to the dissolving action of a hyposulphite solution to which has been added a soluble salt or compound of copper, substantially as described.

2. The process of removing precious metals from ores and metallurgical products, which consists in subjecting the ore or product to the dissolving action of a hyposulphite solution, and then to the dissolving action of a hyposulphite solution to which has been added a soluble compound or salt of copper, substantially as described.

3. The process of separating precious metals from ores and metallurgical products, which consists in leaching the ore or product with a hyposulphite solution, and then leaching it with a hyposulphite solution to which has been added sulphate of copper, substantially as described.

4. The process of separating precious metals from ores and metallurgical products, which consists in subjecting the ore or product to the dissolving action of a hyposulphite solution, and then to the dissolving action of a solution containing the double salt of cupreous hyposulphite and sodium hyposulphite, substantially as described.

In testimony that I claim the foregoing I have hereunto set my hand this 21st day of January, 1884.

EDWARD HUBBARD RUSSELL.

Witnesses:
    JOS. E. GALIGHER,
    E. KIMBALL.